Dec. 28, 1926.
W. M. BOWEN
1,612,257
MOLDING AND PACKING STRIP FOR AUTOMOBILES
Filed April 5, 1926
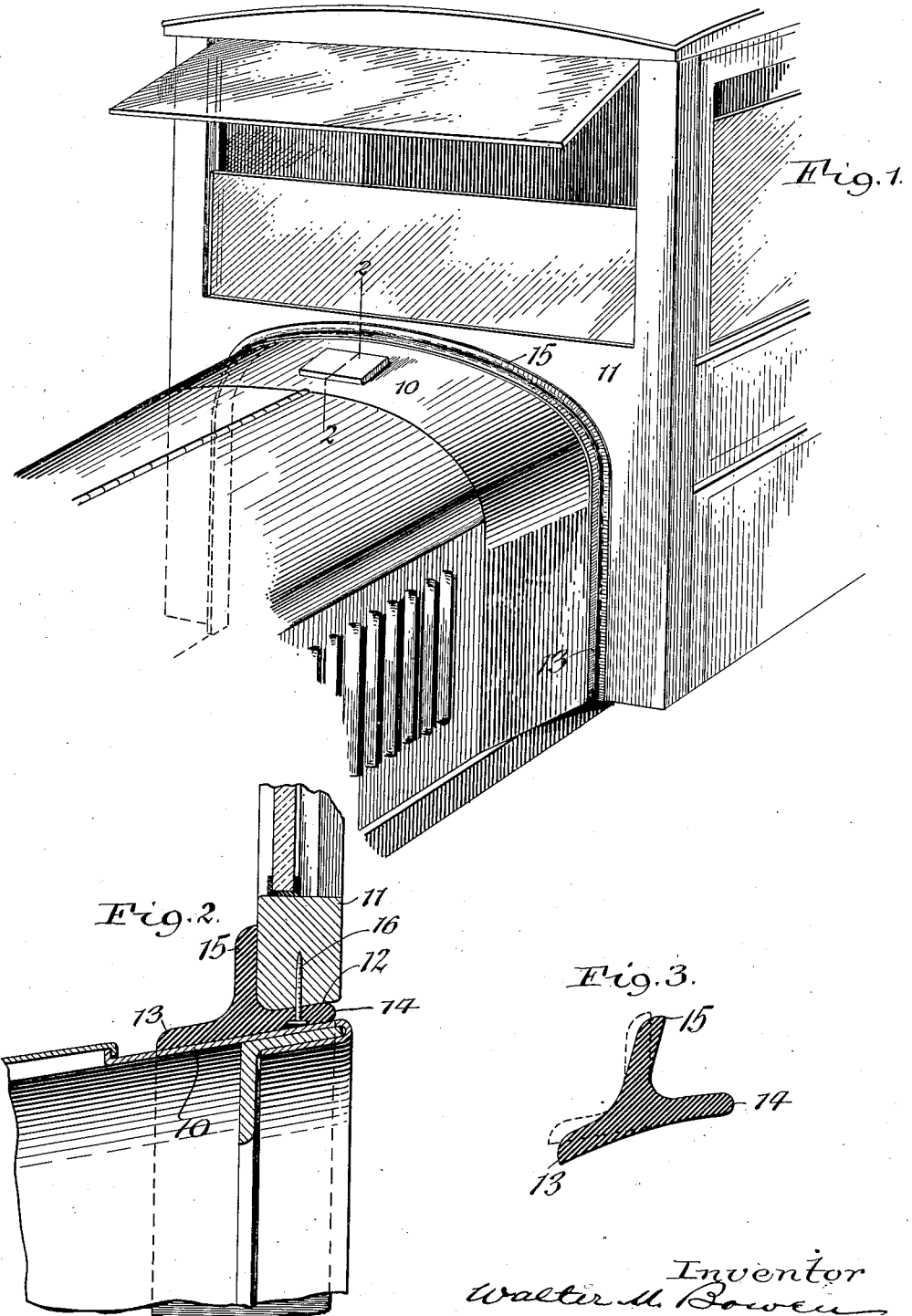

Patented Dec. 28, 1926.

1,612,257

UNITED STATES PATENT OFFICE.

WALTER M. BOWEN, OF BUFFALO, NEW YORK.

MOLDING AND PACKING STRIP FOR AUTOMOBILES.

Application filed April 5, 1926. Serial No. 99,764.

This invention relates to a strip of rubber or similar material for use between the cowl and the front wall of a motor vehicle body or cab in order to produce a weather tight joint therebetween and also prevent squeaking as well as improve its appearance.

Heretofore the inner edge of the opening in the front wall of the cab rested directly on the cowl and the joint was covered on the outer side by a wooden molding to exclude the weather and finish the same. This however is objectionable owing to the squeaking noise resulting from the cowl and front cab wall rubbing against each other, and also the difficulty of producing a good fit of the molding around the cowl and the undue time and cost involved in fitting a cowl and the front wall of a cab to each other in this manner.

It is therefore the object to provide a flexible strip of rubber or the like as a means of packing the joint between the cowl and cab to avoid squeaks and to provide a molded finish on the exterior which is ornamental in appearance and capable of being readily applied at low cost.

In the accompanying drawings:

Figure 1 is a perspective view showing my molding and packing strip embodying my invention applied to the cowl and the front cab wall of a motor vehicle.

Figure 2 is a fragmentary vertical longitudinal section taken on line 2—2 Fig. 1.

Figure 3 is a section of the molding and packing strip similar to Fig. 2 but showing the condition of the same when detached from the cowl and cab.

Similar characters of reference indicate like parts in the several views.

The numeral 10 represents the cowl of a motor vehicle which covers the rear part of the engine space and in this instance is assumed to be made of sheet metal although it may be constructed of any other material.

The cab or body of the car has a transverse front wall 11 which is provided with an opening cut upwardly into the same from the lower side thereof so that the front wall of the cab may be dropped over the cowl and enclose the latter. Instead of resting the inner edge 12 of this front wall of the cab directly on the cowl and then covering the outer side of the joint between the same by a wooden molding, this joint is packed and ornamented by means of the molding and packing strip which is constructed in accordance with my invention and applied as follows:

This strip is made of rubber or similar elastic or flexible material which can be readily bent to conform to varying shapes and will form a cushion in the joint between the parts which oppose each other. In cross section this strip forms a forwardly projecting front flange 13, a rearwardly projecting rear flange 14 arranged in line with the front flange, and a laterally projecting intermediate flange 15 arranged between the front and rear flanges. A rubber strip having these several flanges connected integrally with each other is formed by molding or extruding the material while in a plastic state through a die of suitable shape before vulcanizing, curing and finishing the same. In the normal or relaxed position of the strip when not in use the resilience of the material deflects the front flange inwardly out of its normal operative position and deflects the intermediate flange rearwardly out of its normal operative position, as shown by full lines in Fig. 3.

In the operation of assembling the strip with the cowl and the cab the rear flange of the strip is first secured by nails 16, screws or otherwise to the inner edge 12 of the opening in the front wall of the cab and the intermediate flange is engaged with the front side of this wall, as shown in Fig. 2. While thus applying the strip to the front cab wall the intermediate flange is deflected forwardly from its normal rearwardly inclined position, shown by full lines in Fig. 3, to its tensioned or operative position, shown by dotted lines in the same figure whereby a weather tight joint is produced between the strip and the front cab wall. The body or cab is now dropped onto the chassis and placed with its front wall over the rear part of the cowl so that the front and rear flanges of the strip bear on the cowl as shown in Fig. 2, and the rear flange is compressed between the cowl and said cab wall and the front flange is deflected upwardly from its normally relaxed position, shown by full lines in Fig. 3, to its tensioned or operative position, shown by dotted lines in the same figure.

By this means a weather tight joint is produced between the front cab wall and the cowl and those members are separated by an intervening cushion which prevents the formation of a squeaking noise or rattle.

Furthermore the elasticity of the strip permits the same to adjust itself to the shape of the cowl and make a weather proof joint therewith notwithstanding any uneveness in the shape of either the cowl or the cut out in body or cab of the car thereby avoiding the necessity of a perfectly accurate fit between the cowl and front wall of the cab.

Moreover this strip can be readily bent to fit the contour of the cowl and thus present a neat and finished appearance which is comparatively inexpensive and capable of being produced wthout the expenditure of an undue amount of time and labor and without necessitating specially skilled help for this purpose.

I claim as my invention:

1. A molding and packing strip of rubber or the like for a joint between the cowl and the cab of a motor vehicle consisting of a forwardly projecting front flange, a rearwardly projecting rear flange arranged in line with said front flange, and a laterally projecting intermediate flange arranged between said front and rear flanges, said front and rear flanges being adapted to engage the outer side of said cowl, said rear flange being adapted to engage the inner edge of the front cab wall, and the intermediate flange being adapted to engage the front side of said cab wall, and said front and intermediate flanges being flexed out of their normal or relaxed position upon engaging said cowl and cab wall and assuming their operative position.

2. A motor vehicle comprising a cowl, a cab provided in its front wall with an opening which receives the rear part of said cowl, and a molding and packing strip of rubber having a rear flange arranged between the outer side of said cowl and the inner edge of said cowl opening and secured to said edge a front flange engaging with the outer side of the cowl in advance of said wall, and an intermediate flange projecting laterally from said front and rear flanges and engaging with the front side of said cab wall.

3. A motor vehicle comprising a cowl, a cab provided in its front wall with an opening which receives the rear part of said cowl, and a molding and packing strip of rubber having a rear flange arranged between the outer side of said cowl and the inner edge of said cowl opening and secured to said edge, a front flange engaging with the outer side of the cowl in advance of said wall, and an intermediate flange projecting laterally from said front and rear flanges and engaging with the front side of said cab wall, said front and intermediate flanges being flexed while in their operative position so as to form a weather tight joint with the cowl and cab wall.

In testimony whereof I hereby affix my signature.

WALTER M. BOWEN.